United States Patent (10) Patent No.: US 8,986,574 B2
Won et al. (45) Date of Patent: Mar. 24, 2015

(54) OXYNITRIDE-BASED PHOSPHOR AND LIGHT EMITTING DEVICE INCLUDING THE SAME

(71) Applicants: Samsung Electronics Co., Ltd., Gyeonggi-do (KR); Industry-Academy Cooperation Foundation of Sunchon National University, Jeollanam-do (KR)

(72) Inventors: Hyong Sik Won, Gyeonggi-do (KR); Kee Sun Sohn, Jeollanam-do (KR); Woon Bae Park, Jeollanam-do (KR)

(73) Assignees: Samsung Electronics Co., Ltd., Suwon-Si, Gyeonggi-Do (KR); Industry-Academy Cooperation Foundation of Suncheon National University, Suncheon-Si, Jeollanam-Do (KR)

( * ) Notice: Subject to any disclaimer, the term of this patent is extended or adjusted under 35 U.S.C. 154(b) by 234 days.

(21) Appl. No.: 13/684,410

(22) Filed: Nov. 23, 2012

(65) Prior Publication Data

US 2013/0127330 A1 May 23, 2013

(30) Foreign Application Priority Data

Nov. 23, 2011 (KR) ........................ 10-2011-0122938

(51) Int. Cl.
*H01L 33/50* (2010.01)
*C09K 11/59* (2006.01)
*C09K 11/77* (2006.01)
*F21V 9/16* (2006.01)
*C09K 11/08* (2006.01)

(52) U.S. Cl.
CPC .............. *C09K 11/7731* (2013.01); *F21V 9/16* (2013.01); *C09K 11/0883* (2013.01); *C09K 11/7734* (2013.01)

USPC ...................... 252/301.4 F; 313/503; 257/98

(58) Field of Classification Search
USPC ...................... 252/301.4 F; 313/503; 257/98
See application file for complete search history.

(56) References Cited

U.S. PATENT DOCUMENTS 7,833,436 B2 * 11/2010 Shimooka et al. ....... 252/301.4 F
2009/0033201 A1 * 2/2009 Shimooka et al. ............ 313/483

FOREIGN PATENT DOCUMENTS

EP         1 804 276 A2    7/2007
KR      10-2004-0093374    11/2004
KR      10-2006-0079238    7/2006

* cited by examiner

*Primary Examiner* — Carol M Koslow
(74) *Attorney, Agent, or Firm* — McDermott Will Emery LLP (57) ABSTRACT

There are provided an oxynitride-based phosphor and a light emitting device including the same, the oxynitride-based phosphor containing at least calcium (Ca), barium (Ba), silicon (Si), oxygen (O), and nitrogen (N) as host material components in a host material and having a rare-earth element dissolved in the host material as an activator, wherein the rare-earth element is at least one from a group consisting of manganese (Mn), cerium (Ce), praseodymium (Pr), neodymium (Nd), samarium (Sm), europium (Eu), gadolinium (Gd), dysprosium (Dy), terbium (Tb), holmium (Ho), erbium (Er), thulium (Tm), and ytterbium (Yb), and the host material has a monoclinic crystal structure in which a crystal lattice according to a peak of an X-ray powder diffraction pattern has values of a=7.076, b=23.888, c=4.827, $\alpha=\gamma=90°$, and $\beta=109.110°$.

20 Claims, 5 Drawing Sheets

OXYNITRIDE-BASED PHOSPHOR AND LIGHT EMITTING DEVICE INCLUDING THE SAME

CROSS-REFERENCE TO RELATED APPLICATIONS

This application claims the priority of Korean Patent Application No. 10-2011-0122938 filed on Nov. 23, 2011, in the Korean Intellectual Property Office, the disclosure of which is incorporated herein by reference.

BACKGROUND

1. Field of the Invention

The present disclosure relates to an oxynitride-based phosphor having a novel crystal structure and a light emitting device including the same.

2. Description of the Related Art

In general, a white light emitting diode (LED) recently prominent due to the use in lighting devices, LCD backlights, automobile lighting devices, and the like, includes an LED emitting blue or near ultraviolet light and as an excitation source, a phosphor converting a wavelength of the light emitted from the LED into visible light.

A representative method of implementing the white LED includes employing a blue LED formed of an InGaN-based material having a wavelength of 450 to 550 nm as a light emitting element and employing a YAG-based phosphor emitting yellow light and represented by a compositional formula of $(Y, Gd)_3(Al, Ga)_5O_{12}$ as a phosphor. In the white LED, blue light emitted from the light emitting element is incident on a phosphor layer and repeatedly absorbed and scattered within the phosphor layer. Yellow light formed by wavelength converted blue light and a portion of the incident blue light are mixed, such that the blue light absorbed in the phosphor through the repeated process may appear to human eyes as white light.

However, the white LED having such a structure has few red light components in light thereof, a high color temperature, and insufficient green light components, and thus, merely functions as illumination light having low color rendering properties.

In addition, oxide-based phosphors generally tend to be degraded in terms of luminous intensity when a wavelength of an excitation source is above 400 nm, and accordingly, are not appropriate for implementing white light having high brightness using blue light.

Therefore, oxynitride-based phosphors having excellent luminous efficiency in the case in which a wavelength of an excitation source is above 400 nm, while having stability equal to or greater than that of oxide-based phosphors, have recently been receiving attention in white LED application fields. The oxynitride-based phosphors are materials originally developed as engineering ceramics and thus, have a low reduction in efficiency and low levels of color change due to moisture or heat.

However, research into oxynitride-based phosphors present in a compositional area outside of α-type or β-type sialon (Si—Al—O—N) phosphors, has not been greatly undertaken or is little known.

SUMMARY

An aspect of the present disclosure provides an oxynitride-based phosphor having excellent structural stability, in particular, having excellent luminescent brightness in a red light wavelength band and a novel crystal structure facilitating improvements in luminescent brightness to thereby be appropriately used in LED fields of application.

Another aspect of the present disclosure also provides a light emitting device including the oxynitride-based phosphor.

According to an aspect of the present disclosure, there is provided an oxynitride-based phosphor containing at least calcium (Ca), barium (Ba), silicon (Si), oxygen (O) and nitrogen (N) as host material components in a host material and having a rare-earth element dissolved in the host material as an activator, wherein the rare-earth element is at least one from a group consisting of manganese (Mn), cerium (Ce), praseodymium (Pr), neodymium (Nd), samarium (Sm), europium (Eu), gadolinium (Gd), dysprosium (Dy), terbium (Tb), holmium (Ho), erbium (Er), thulium (Tm), and ytterbium (Yb), and the host material has a monoclinic crystal structure in which a crystal lattice according to a peak of an X-ray powder diffraction pattern has values of a=7.076, b=23.888, c=4.827, α=γ=90°, and β=109.110° and rates of change of a, b, c, α, β, and γ are respectively 5% or less.

The host material may further contain Sr.

The host material may be represented by a compositional formula: $Ca_{x-w}Ba_ySr_zSi_uO_vN_{4u/3}:Eu_w$, and $1.8 \le x \le 2.2$, $0.8 \le y+z \le 1.2$, $4.5 \le u \le 7.5$, $v=x+y+z+w$, and $w \le 0.2$ may be satisfied.

In the compositional formula, y>z may be satisfied.

In the compositional formula, $0.01 \le w \le 0.1$ may be satisfied.

A ratio of Ca, Ba, and Si contained in the host material may be 2:1:6.

The oxynitride-based phosphor may exhibit a light emitting peak wavelength of 580 to 620 nm with respect to excitation light having a peak wavelength range of 250 to 550 nm.

The oxynitride-based phosphor may have an average particle size of 1 to 20 μm.

According to another aspect of the present disclosure, there is provided light emitting device, comprising: a light emitting element emitting excitation light; and a wavelength converting unit absorbing the excitation light and emitting visible light, wherein the wavelength converting unit is a phosphor containing at least calcium (Ca), barium (Ba), silicon (Si), oxygen (O), and nitrogen (N) as host material components in a host material and having a rare-earth element dissolved in the host material as an activator, the rare-earth element being at least one from a group consisting of manganese (Mn), cerium (Ce), praseodymium (Pr), neodymium (Nd), samarium (Sm), europium (Eu), gadolinium (Gd), dysprosium (Dy), terbium (Tb), holmium (Ho), erbium (Er), thulium (Tm), and ytterbium (Yb), and the host material has a monoclinic crystal structure in which a crystal lattice according to a peak of an X-ray powder diffraction pattern has values of a=7.076, b=23.888, c=4.827, α=γ=90°, and β=109.110° and rates of change of a, b, c, α, β, and γ are respectively 5% or less. The light emitting element may be an ultraviolet light emitting diode or blue light emitting diode.

According to another aspect of the present disclosure, a method of making an oxynitride-based phosphor containing at least calcium (Ca), barium (Ba), silicon (Si), oxygen (O), and nitrogen (N) as host material components in a host material and having a rare-earth element dissolved in the host material as an activator is provided. The method comprises mixing silicon nitride powder, calcium oxide powder, barium oxide powder, and a rare earth element oxide powder to form a mixture; firing the mixture; and crushing the fired mixture. The rare-earth element is at least one from a group consisting of manganese (Mn), cerium (Ce), praseodymium (Pr), neodymium (Nd), samarium (Sm), europium (Eu), gadolinium (Gd), dysprosium (Dy), terbium (Tb), holmium (Ho), erbium (Er), thulium (Tm), and ytterbium (Yb). The host material has a monoclinic crystal structure in which a crystal lattice according to a peak of an X-ray powder diffraction pattern has values of a=7.076, b=23.888, c=4.827, $\alpha=\gamma=90°$, and $\beta=109.110°$ and rates of change of a, b, c, $\alpha$, $\beta$, and $\gamma$ are respectively 5% or less.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

An oxynitride-based phosphor according to an embodiment of the present disclosure contains at least calcium (Ca), barium (Ba), silicon (Si), oxygen (O), and nitrogen (N) as host material components in a host material and has a rare-earth element dissolved in the host material as an activator, and in this case, the rare-earth element is at least one from a group consisting of manganese (Mn), cerium (Ce), praseodymium (Pr), neodymium (Nd), samarium (Sm), europium (Eu), gadolinium (Gd), dysprosium (Dy), terbium (Tb), holmium (Ho), erbium (Er), thulium (Tm), and ytterbium (Yb), and the host material has a monoclinic crystal structure in which a crystal lattice according to a peak of an X-ray powder diffraction pattern has values of a=7.076, b=23.888, c=4.827, $\alpha=\gamma=90°$, and $\beta=109.110°$ and rates of change of a, b, c, $\alpha$, $\beta$, and $\gamma$ are respectively 5% or less. That is, in the host material, a monoclinic crystal structure in which crystal axis lengths of a, b, and c are different, an a-axis is perpendicular to a b-axis and a c-axis, and the b-axis is not perpendicular to the c-axis may be maintained, and rates of change of a, b, c, $\alpha$, $\beta$, and $\gamma$ may be ±5% based on the values basically provided as above.

In this case, a space group in the monoclinic crystal structure may be one of C2, Cm, and C2/m.

The oxynitride-based phosphor having the above-mentioned structure has a novel crystal structure, not known in the related art. In particular, in the case in which Eu or the like is dissolved as a lighting metal element, when ultraviolet light or visible light is irradiated thereonto as an excitation source, the oxynitride-based phosphor has excellent efficiency in a red or red-neighboring wavelength band, for example, an orange wavelength band, such that the oxynitride-based phosphor may serve as a wavelength converting unit to thereby be appropriately used as a phosphor for a light emitting element such as a light emitting diode or the like. By using the light emitting element and a phosphor composition, a light emitting device, in particular, a light emitting device capable of emitting white light may be implemented. A detailed description of a novel crystal structure of the oxynitride-based phosphor will be described below.

Figure 1:
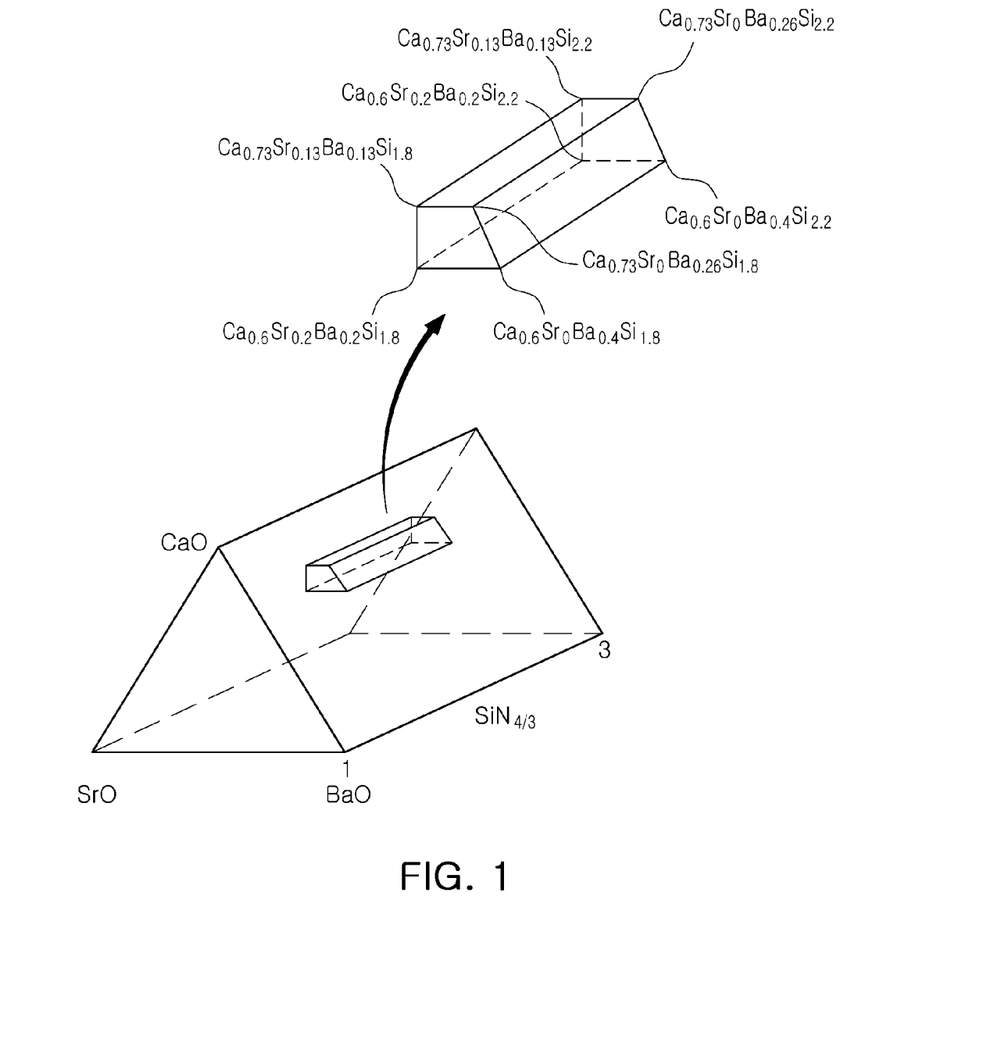
FIG. 1 is a quaternary compositional diagram schematically illustrating host material composition conditions of an oxynitride-based phosphor according to an embodiment of the present disclosure.

In the oxynitride-based phosphor, the host material may further contain strontium (Sr), and in this case, the host material may be represented by a compositional formula: $Ca_{x-w}Ba_ySr_zSi_uO_vN_{4u/3}:Eu_w$. Here, x, y, z, u, v, and w may satisfy the following conditions, and a compositional range of the host material may be more accurately shown with reference to the quaternary compositional diagram of FIG. 1.

$$1.8 \leq x \leq 2.2 \tag{1}$$

$$0.8 \leq y+z \leq 1.2 \tag{2}$$

$$4.5 \leq u \leq 7.5 \tag{3}$$

$$v = x+y+z+w \tag{4}$$

$$w \leq 0.2 \tag{5}$$

According to implementation of the inventor, in the case in which x, y, z, u, v, and w are outside of the above-ranges, the crystal structure is varied, rather than being a monoclinic crystal structure, such that intended characteristics of the phosphor may not be obtained. However, satisfying the above compositional conditions is not necessarily required to obtain the monoclinic crystal structure, and if the monoclinic crystal structure is obtained even in the case in which x, y, z, u, v, and w are outside of the above-ranges, it can be appreciated that they are included within the scope of the present disclosure.

Further, the host material may satisfy the following conditions in the compositional formula.

$$y > z \tag{7}$$

$$0.01 \leq w \leq 0.1 \tag{8}$$

In particular, when a ratio of Ca, Ba, and Si contained in the host materials 2:1:6, a monoclinic crystal structure may be stably formed to thereby obtain a phosphor having excellent efficiency.

Meanwhile, the phosphor having the above-mentioned structure may be made of oxynitride and thus, may have excellent structural stability, such that the phosphor may have excellent stability in environments including an oxidation atmosphere or a moist environment. In addition, the phosphor may have a monoclinic crystal structure having low symmetry, such that a phenomenon in which excited electrons radiate heat and return to a ground state may be suppressed to increase luminous efficiency, thereby facilitating the obtaining of a phosphor having excellent brightness characteristics.

It is preferable that a phosphor composition having the compositional formula is configured in a single phase, but may include an amorphous crystal phase inevitably generated in an imperceptible amount during a manufacturing process, or other crystal phases rather than a monoclinic crystalline phase. The phosphor composition may include a compound including the amorphous crystal phase or other crystal phases, as long as characteristics thereof are not affected thereby.

Meanwhile, an average particle size of the phosphor according to the embodiment of the present disclosure may be in the range of 1 to 20 μm. This is because that when the average particle size is smaller than 1 μm, a light absorbing rate may be degraded due to scattering and uniform dispersion to a resin material enclosing an LED may not be facilitated, while when the average particle size is greater than 20 μm, irregularity of luminous intensity and color may occur.

Hereinafter, a method of manufacturing the oxynitride-based phosphor having the above-mentioned structure may be described by way of an example.

As for raw materials for manufacturing the phosphor, silicon nitride ($Si_3N_4$) powder, calcium oxide (CaO) powder, barium oxide (BaO) powder, strontium oxide (SrO) powder and europium oxide ($Eu_2O_3$) powder were used as main components, Ca, Ba, Sr, Si, and Eu. The raw materials such as CaO, BaO, SrO, $\alpha$-$Si_3N_4$, and $Eu_2O_3$ were weighed and mixed in order to have a predetermined composition, and in this case, the amount of mixture per sample was 1 g. The mixing operation of the raw materials was manually undertaken for 10 minutes in an ambient atmosphere. The mixture samples obtained as above were fired under a nitrogen gas atmosphere in which nitrogen gas having a higher pressure than atmospheric pressure and a lower pressure than an air pressure of 20 atm, as a main component and $H_2$ gas of 0~25% were provided. When firing is performed under the nitrogen gas atmosphere as above, decomposition of a nitride synthesized during high temperature firing may be prevented or inhibited, and a compositional deviation in the produced nitride may be reduced to enable the fabricating of a phosphor composition having excellent performance. Meanwhile, the fact that nitrogen gas is provided as a main component means that nitrogen gas is included in the amount of 75% or higher of the overall gas. In addition, a firing temperature may be 1400~1600° C., and preferably, 1450° C. or higher, in order to obtain a high quality phosphor. In addition, a firing time may be provided within a range of 30 minutes to 100 hours, but preferably, may be 2 hours to 12 hours in consideration of quality and productivity.

In the embodiment, firing was undertaken at a firing temperature of 1525° C. for 8 hours, under atmospheric pressure, and an ultrapure nitrogen (99.999%) gas atmosphere, and then a crushing operation was performed thereon to fabricate a phosphor.

Hereinafter, the oxynitride-based phosphor according to the embodiment of the present disclosure will be described in detail with reference to specific Examples. The following Examples 1 to 5 were provided to confirm X-ray diffraction (XRD) pattern differences. The Examples 6 to 8 (Comparative Examples) were provided to show that phases of oxynitride-based phosphors obtained according to the Comparative Examples with a composition outside of a composition range according to the embodiment of the present disclosure are different from those of the oxynitride-based phosphors according to the embodiment of the present disclosure by analyzing XRD patterns.

Example 1

As raw powder materials for a phosphor composition according to Example 1, 0.1920 g of CaO, 0.0000 g of SrO, 0.2439 g of BaO, 0.4960 g of $\alpha$-$Si_3N_4$, and 0.0381 g of $Eu_2O_3$ were respectively weighed and then manually mixed using a mortar under an ambient atmosphere to obtain 1 g of the raw powder mixture. The 1 g of the raw powder mixture was inserted into a crucible, nitrogen gas was provided to the interior of a firing furnace in an amount of 500 cc per minute, a firing treatment through heating undertaken at 1525° C. performed for 8 hours, and then, a crushing operation was carried out thereon to obtain a phosphor composition. When the phosphor composition was excited by a light source of 460 nm, it was confirmed that the phosphor composition emits orange light.

Example 2

As raw powder materials for a phosphor composition according to Example 2, 0.1805 g of CaO, 0.0692 g of SrO, 0.1940 g of BaO, 0.5184 g of $\alpha$-$Si_3N_4$, and 0.0379 g of $Eu_2O_3$ were respectively weighed and then manually mixed using a mortar under an ambient atmosphere to obtain 1 g of the raw powder mixture. The 1 g of the raw powder mixture was inserted into a crucible, nitrogen gas was provided to the interior of a firing furnace in an amount of 500 cc per minute, a firing treatment through heating undertaken at 1525° C. performed for 8 hours, and then, a crushing operation was carried out thereon to obtain a phosphor composition. When the phosphor composition was excited by a light source of 460 nm, it was confirmed that the phosphor composition emits orange light.

Example 3

As raw powder materials for a phosphor composition according to Example 3, 0.1803 g of CaO, 0.0676 g of SrO, 0.2054 g of BaO, 0.5086 g of $\alpha$-$Si_3N_4$, and 0.0381 g of $Eu_2O_3$ were respectively weighed and then manually mixed using a mortar under an ambient atmosphere to obtain 1 g of the raw powder mixture. The 1 g of the raw powder mixture was inserted into a crucible, nitrogen gas was provided to the interior of a firing furnace in an amount of 500 cc per minute, a firing treatment through heating undertaken at 1525° C. performed for 8 hours, and then, a crushing operation was carried out thereon to obtain a phosphor composition. When the phosphor composition was excited by a light source of 460 nm, it was confirmed that the phosphor composition emits orange light.

Example 4

As raw powder materials for a phosphor composition according to Example 4, 0.1720 g of CaO, 0.0462 g of SrO, 0.2685 g of BaO, 0.4748 g of $\alpha$-$Si_3N_4$, and 0.0385 g of $Eu_2O_3$ were respectively weighed and then manually mixed using a mortar under an ambient atmosphere to obtain 1 g of the raw powder mixture. The 1 g of the raw powder mixture was inserted into a crucible, nitrogen gas was provided to the interior of a firing furnace in an amount of 500 cc per minute, a firing treatment through heating undertaken at 1525° C. performed for 8 hours, and then, a crushing operation was carried out thereon to obtain a phosphor composition. When the phosphor composition was excited by a light source of 460 nm, it was confirmed that the phosphor composition emits orange light.

Example 5

As raw powder materials for a phosphor composition according to Example 5, 0.2056 g of CaO, 0.0777 g of SrO, 0.1532 g of BaO, 0.5239 g of α-Si₃N₄, and 0.0397 g of Eu₂O₃ were respectively weighed and then manually mixed using a mortar under an ambient atmosphere to obtain 1 g of the raw powder mixture. The 1 g of the raw powder mixture was inserted into a crucible, nitrogen gas was provided to the interior of a firing furnace in an amount of 500 cc per minute, a firing treatment through heating undertaken at 1525° C. performed for 8 hours, and then, a crushing operation was carried out thereon to obtain a phosphor composition. When the phosphor composition was excited by a light source of 460 nm, it was confirmed that the phosphor composition emits orange light.

Example 6

As raw powder materials for a phosphor composition according to Example 6, 0.0586 g of CaO, 0.3084 g of SrO, 0.0917 g of BaO, 0.5074 g of α-Si₃N₄, and 0.0339 g of Eu₂O₃ were respectively weighed and then manually mixed using a mortar under an ambient atmosphere to obtain 1 g of the raw powder mixture. The 1 g of the raw powder mixture was inserted into a crucible, nitrogen gas was provided to the interior of a firing furnace in an amount of 500 cc per minute, a firing treatment through heating undertaken at 1525° C. performed for 8 hours, and then, a crushing operation was carried out thereon to obtain a phosphor composition. When the phosphor composition was excited by a light source of 460 nm, it was confirmed that the phosphor composition emits red light. As a result of XRD analysis, it was confirmed that the phosphor composition has a rhombic crystal structure of $Sr Si_5N_8$.

Example 7

As raw powder materials for a phosphor composition according to Example 7, 0.4109 g of CaO, 0.0000 g of SrO, 0.0000 g of BaO, 0.5354 g of α-Si₃N₄, and 0.0537 g of Eu₂O₃ were respectively weighed and then manually mixed using a mortar under an ambient atmosphere to obtain a 1 g of the raw powder mixture. The 1 g of the raw powder mixture was inserted into a crucible, nitrogen gas was provided to the interior of a firing furnace in an amount of 500 cc per minute, a firing treatment through heating undertaken at 1525° C. performed for 8 hours, and then, a crushing operation was carried out thereon to obtain a phosphor composition. When the phosphor composition was excited by a light source of 460 nm, it was confirmed that the phosphor composition emits orange light. As a result of XRD analysis, it was confirmed that the phosphor composition has a cubic crystal structure of $Ca_{15}Si_{18}Al_2O_{12}N_{18}$.

Example 8

As raw powder materials for a phosphor composition according to Example 8, 0.0001 g of CaO, 0.4339 g of SrO, 0.0066 g of BaO, 0.5284 g of α-Si₃N₄, and 0.0310 g of Eu₂O₃ were respectively weighed and then manually mixed using a mortar under an ambient atmosphere to obtain 1 g of the raw powder mixture. The 1 g of the raw powder mixture was inserted into a crucible, nitrogen gas was provided to the interior of a firing furnace in an amount of 500 cc per minute, a firing treatment through heating undertaken at 1525° C. performed for 8 hours, and then, a crushing operation was carried out thereon to obtain a phosphor composition. When the phosphor composition was excited by a light source of 460 nm, it was confirmed that the phosphor composition emits orange light. As a result of XRD analysis, it was confirmed that the phosphor composition has a mixed-phase crystal structure of $Sr Si_5N_8$ and $SrSi_2O_2N_2$.

Mixing ratios of the raw materials according to the Examples 1 to 8 and consequent luminescent characteristics thereof were arranged in the table 1 below. In this case, values of peak wavelengths were approximately deduced.

TABLE 1

| Example | Mixing Ratios of Raw Materials | | | | | Peak Wavelength (nm) |
| --- | --- | --- | --- | --- | --- | --- |
| | CaO | SrO | BaO | Si₃N₄ | Eu₂O₃ | |
| 1 | 0.1920 | 0.0000 | 0.2739 | 0.4960 | 0.0381 | 601 |
| 2 | 0.1805 | 0.0692 | 0.1940 | 0.5184 | 0.0379 | 601 |
| 3 | 0.1803 | 0.0676 | 0.2054 | 0.5086 | 0.0381 | 600 |
| 4 | 0.1720 | 0.0462 | 0.2685 | 0.4748 | 0.0385 | 600 |
| 5 | 0.2056 | 0.0777 | 0.1532 | 0.5239 | 0.0397 | 604 |
| 6 | 0.0586 | 0.3084 | 0.0917 | 0.5074 | 0.0339 | 662 |
| 7 | 0.4109 | 0.0000 | 0.0000 | 0.5354 | 0.0537 | 620 |
| 8 | 0.0001 | 0.4339 | 0.0066 | 0.5284 | 0.0310 | 650 |

Figure 2:
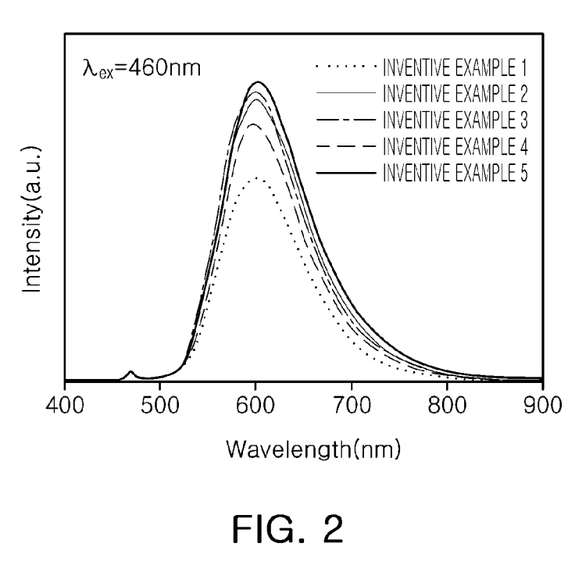
FIG. 2 is a diagram illustrating photoluminescence (PL) characteristics of phosphors according to Examples 1 to 5 of the present disclosure.
Figure 3:
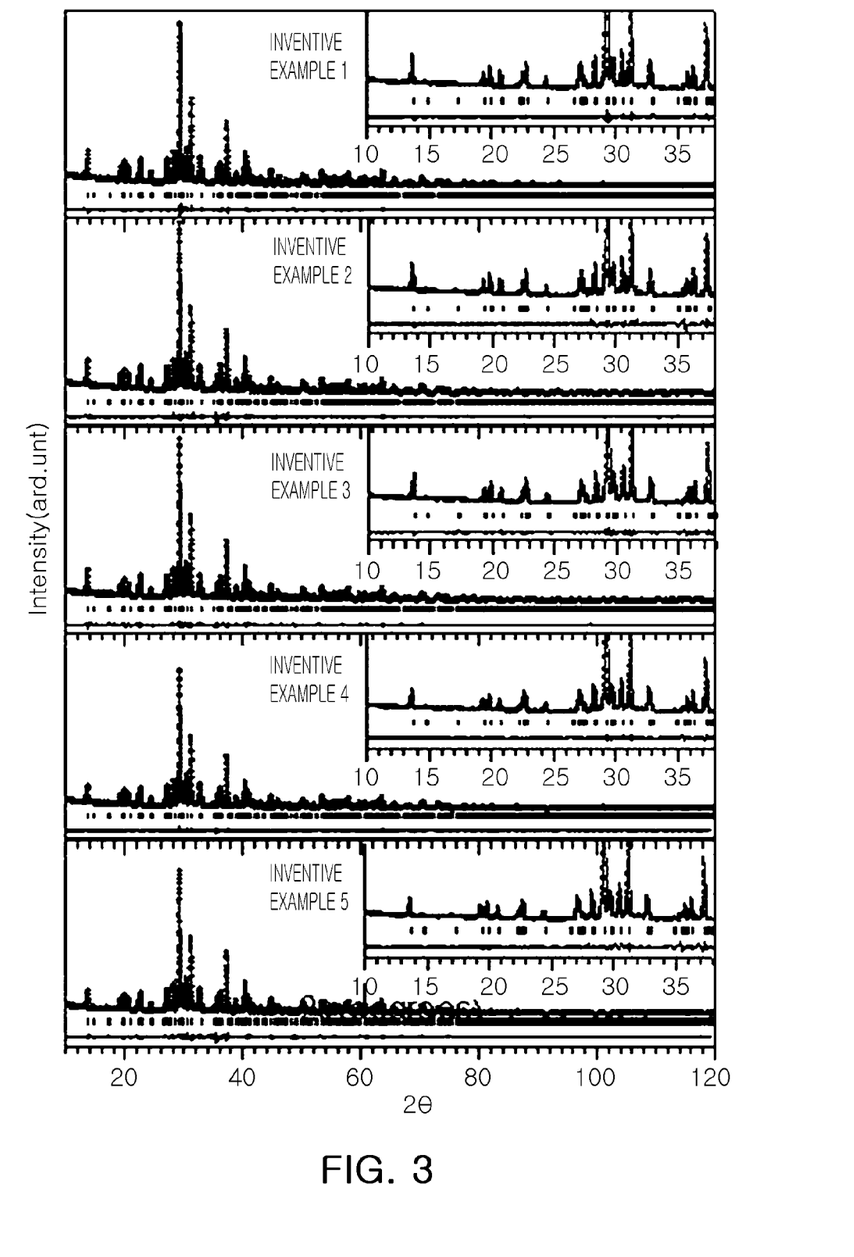
FIG. 3 is a diagram illustrating profile matching results using X-ray diffraction (XRD) patterns of the phosphors according to Examples 1 to 5 of the present disclosure.

As shown in FIG. 2, luminescent properties of the phosphor compositions fabricated as above were analyzed by using a photoluminescence (PL) device. Meanwhile, as shown in FIG. 3, crystal structures of the phosphor compositions were analyzed through X-ray diffraction (XRD). In order to precisely analyze a crystal structure, profile matching was performed on the phosphor compositions selected after the XRD analysis.

FIG. 3 is a diagram illustrating profile matching results for the Examples 1 to 5. In the case of a phosphor according to the Example 1, it was confirmed that a crystal having a monoclinic crystal structure in which a=7.076, b=23.888, c=4.827, α=γ=90°, and β=109.110° was obtained, which may be also supported by the PL-measured results of FIG. 2. A phosphor composition basically formed of Ca, Ba, Si, O, and N and having a monoclinic crystal structure was not known to the related art. In addition, a composition corresponding to a square pillar shown in FIG. 1 indicates a practical composition range of Ca, Ba, Sr, and Si, capable of obtaining a single-phase composition having a monoclinic crystal structure, and as can be seen in FIG. 3, it may be confirmed through the results of Examples 2 to 5. The monoclinic crystal structure of the host material of the phosphor according to the embodiment of the present disclosure, based on the profile matching results of the Examples 1 to 5 through XRD analysis, is required to have a structure in which the values of a, b, c, α, β, and γ are basically maintained, while rates of change of a, b, c, α, and β and γ are respectively 5% or less.

Figure 4:
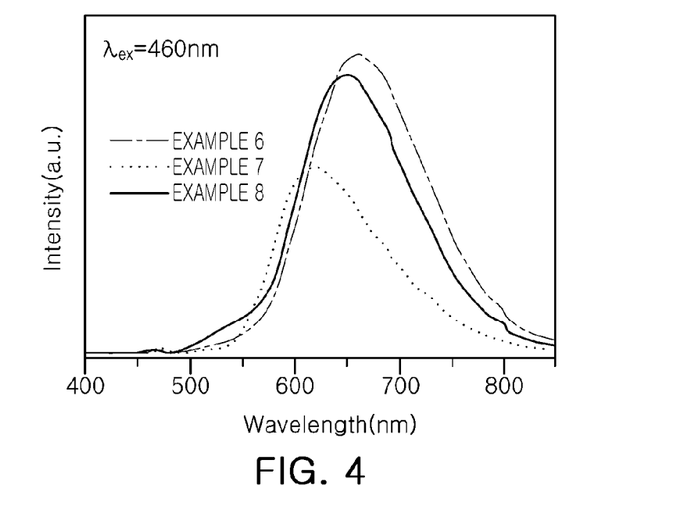
FIG. 4 is a diagram illustrating PL characteristics of phosphors according to Comparative Examples (Examples 6 to 8)
Figure 5:
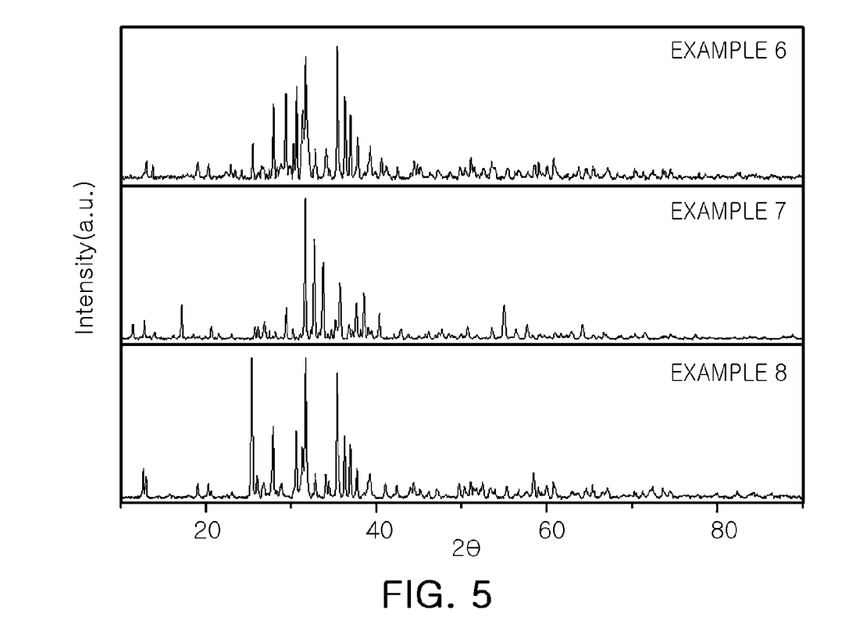
FIG. 5 is a diagram illustrating XRD patterns of the phosphors according to the Comparative Examples (Examples 6 to 8)

In the case of phosphors outside of the composition range, it was confirmed that they do not have a monoclinic crystal structure, as can be seen in the analysis result of Examples 6 to 8 (FIG. 4 and FIG. 5). Thus, Examples 6 to 8 may correspond to Comparative Examples. As can be seen from the XRD analysis results of FIG. 5, a phosphor of Example 6 was $Sr_2Si_5N_8$ having a rhombic crystal structure; a phosphor of Example 7 was $Ca_{15}Si_{18}Al_2O_{12}N_{18}$ having a cubic crystal structure; and a phosphor of Example 8 has a mixed-phase of $Sr_2Si_5N_8$ and $SrSi_2O_2N_2$. The analysis results may be supported by the PL-measured results of FIG. 4.

Figure 6:
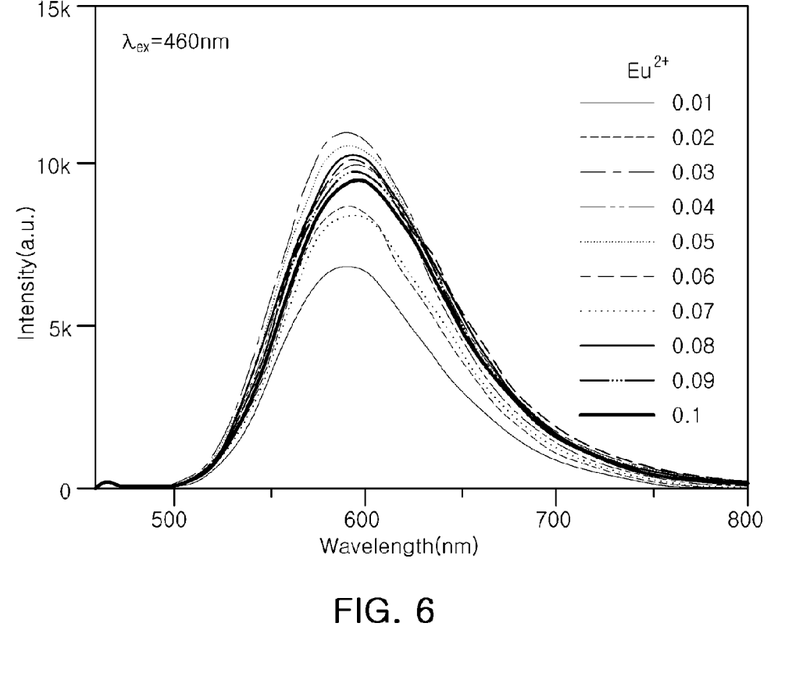
FIG. 6 is a diagram illustrating measured PL value results of the phosphors according to the Examples of the present disclosure, depending on concentrations of $Eu^{2+}$.

Meanwhile, luminous efficiency according to the concentration of $Eu^{2+}$ was further experimented within the composition range according to the embodiment of the present disclosure. In the experimentation, a phosphor composition has a compositional formula of $Ca_2Ba_{1-x}Sr_xSi_6O_3N_8$, wherein x=0. The result obtained by measuring PL values according to the concentration of $Eu^{2+}$ was illustrated in FIG. 6. Referring to FIG. 6, when the concentration of $Eu^{2+}$ is 0.03 mol, that is, in the case of a phosphor composition in which w=0.03 in the compositional formula, highest PL characteristics were exhibited. As the concentration of $Eu^{2+}$ is higher, PL characteristics may be lowered. Considering PL characteristics of FIG. 6, it may be preferable that w is within a range of $0.01 \le w \le 0.1$.

As set forth above, according to embodiments of the disclosure, there can be provided an oxynitride-based phosphor having excellent structural stability, in particular, having excellent luminescent brightness in a red light wavelength band and a novel crystal structure facilitating improvements in luminescent brightness to thereby be appropriately used in LED fields of application, and a light emitting device including the same.

While the present disclosure has been shown and described in connection with the embodiments, it will be apparent to those skilled in the art that modifications and variations can be made without departing from the spirit and scope of the invention as defined by the appended claims.

What is claimed is:

1. An oxynitride-based phosphor containing at least calcium (Ca), barium (Ba), silicon (Si), oxygen (O), and nitrogen (N) as host material components in a host material and having a rare-earth element dissolved in the host material as an activator,
   wherein the rare-earth element is at least one from a group consisting of manganese (Mn), cerium (Ce), praseodymium (Pr), neodymium (Nd), samarium (Sm), europium (Eu), gadolinium (Gd), dysprosium (Dy), terbium (Tb), holmium (Ho), erbium (Er), thulium (Tm), and ytterbium (Yb), and
   the host material has a monoclinic crystal structure in which a crystal lattice according to a peak of an X-ray powder diffraction pattern has values of a=7.076, b=23.888, c=4.827, $\alpha=\gamma=90°$, and $\beta=109.110°$ and rates of change of a, b, c, $\alpha$, $\beta$, and $\gamma$ are respectively 5% or less.

2. The oxynitride-based phosphor of claim 1, wherein the host material further contains strontium (Sr).

3. The oxynitride-based phosphor of claim 2, wherein the host material is represented by a compositional formula: $Ca_{x-w}Ba_ySr_zSi_uO_vN_{4u/3}:Eu_w$, and $1.8 \le x \le 2.2$, $0.8 \le y+z \le 1.2$, $4.5 \le u \le 7.5$, $v=x+y+z+w$, and $w \le 0.2$ are satisfied.

4. The oxynitride-based phosphor of claim 3, wherein in the compositional formula, y>z is satisfied.

5. The oxynitride-based phosphor of claim 3, wherein in the compositional formula, $0.01 \le w \le 0.1$ is satisfied.

6. The oxynitride-based phosphor of claim 1, wherein a ratio of Ca, Ba, and Si contained in the host material is 2:1:6.

7. The oxynitride-based phosphor of claim 1, wherein the oxynitride-based phosphor exhibits a light emitting peak wavelength of 580 to 620 nm with respect to excitation light having a peak wavelength range of 250 to 550 nm.

8. The oxynitride-based phosphor of claim 1, wherein the oxynitride-based phosphor has an average particle size of 1 to 20 µm.

9. A light emitting device, comprising:
   a light emitting element emitting excitation light; and
   a wavelength converting unit absorbing the excitation light and emitting visible light,
   wherein the wavelength converting unit includes an oxynitride-based phosphor containing at least calcium (Ca), barium (Ba), silicon (Si), oxygen (O), and nitrogen (N) as host material components in a host material and having a rare-earth element dissolved in the host material as an activator, the rare-earth element being at least one from a group consisting of manganese (Mn), cerium (Ce), praseodymium (Pr), neodymium (Nd), samarium (Sm), europium (Eu), gadolinium (Gd), dysprosium (Dy), terbium (Tb), holmium (Ho), erbium (Er), thulium (Tm), and ytterbium (Yb), and the host material has a monoclinic crystal structure in which a crystal lattice according to a peak of an X-ray powder diffraction pattern has values of a=7.076, b=23.888, c=4.827, $\alpha=\gamma=90°$, and $\beta=109.110°$ and rates of change of a, b, c, $\alpha$, $\beta$, and $\gamma$ are respectively 5% or less.

10. The light emitting device of claim 9, wherein the light emitting element is an ultraviolet light emitting diode or blue light emitting diode.

11. The light emitting device of claim 9, wherein the host material further contains strontium (Sr).

12. The light emitting device of claim 11, wherein the host material is represented by a compositional formula: $Ca_{x-w}Ba_ySr_zSi_uO_vN_{4u/3}:Eu_w$, and $1.8 \le x \le 2.2$, $0.8 \le y+z \le 1.2$, $4.5 \le u \le 7.5$, $v=x+y+z+w$, and $w \le 0.2$ are satisfied.

13. The light emitting device of claim 12, wherein in the compositional formula, y>z is satisfied.

14. The light emitting device of claim 12, wherein in the compositional formula, $0.01 \le w \le 0.1$ is satisfied.

15. The light emitting device of claim 9, wherein a ratio of Ca, Ba, and Si contained in the host material is 2:1:6.

16. A method of making an oxynitride-based phosphor containing at least calcium (Ca), barium (Ba), silicon (Si), oxygen (O), and nitrogen (N) as host material components in a host material and having a rare-earth element dissolved in the host material as an activator, comprising:
   mixing silicon nitride powder, calcium oxide powder, barium oxide powder, and a rare earth element oxide powder to form a mixture;
   firing the mixture; and
   crushing the fired mixture,
   wherein the rare-earth element is at least one from a group consisting of manganese (Mn), cerium (Ce), praseodymium (Pr), neodymium (Nd), samarium (Sm), europium (Eu), gadolinium (Gd), dysprosium (Dy), terbium (Tb), holmium (Ho), erbium (Er), thulium (Tm), and ytterbium (Yb), and
   the host material has a monoclinic crystal structure in which a crystal lattice according to a peak of an X-ray powder diffraction pattern has values of a=7.076, b=23.888, c=4.827, $\alpha=\gamma=90°$, and $\beta=109.110°$ and rates of change of a, b, c, $\alpha$, $\beta$, and $\gamma$ are respectively 5% or less.

17. The method of making an oxynitride-based phosphor according to claim 16, wherein the mixture is fired under a nitrogen gas atmosphere.

18. The method of making an oxynitride-based phosphor according to claim 17, wherein the nitrogen gas atmosphere is at a pressure greater than atmospheric pressure and lower than 20 atm.

19. The method of making an oxynitride-based phosphor according to claim 17, wherein the nitrogen gas atmosphere further comprises 0-25% hydrogen gas.

20. The method of making an oxynitride-based phosphor according to claim 16, wherein the mixture is fired at a temperature of about 1400-1600° C.

* * * * *